W. D. PARSON.
Wind-Mill.
No. 159,207.   Patented Jan. 26, 1875.
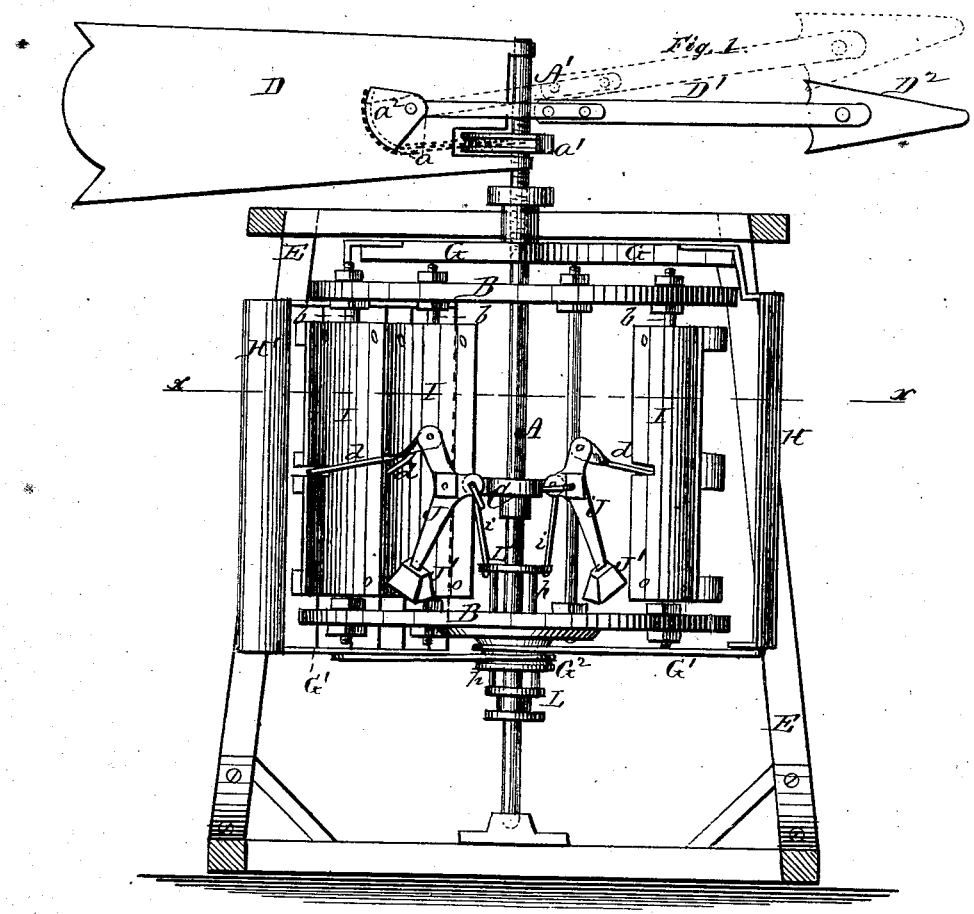
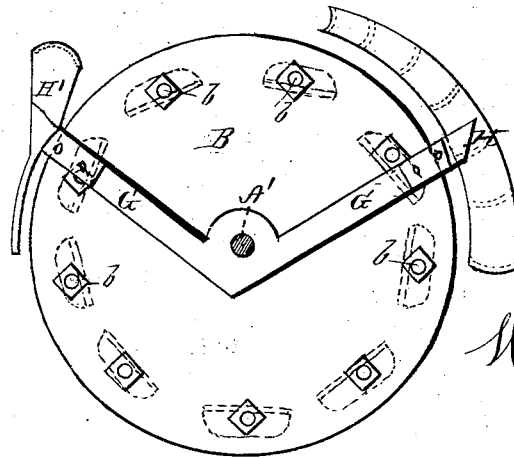
Fig. 2.
WITNESSES:
P. C. Dietench
H. C. Scott
INVENTOR.
Warren D. Parson
per
C. H. Watson & Co
ATTORNEYS.

UNITED STATES PATENT OFFICE.

WARREN D. PARSON, OF DENVER, COLORADO TERRITORY.

IMPROVEMENT IN WINDMILLS.

Specification forming part of Letters Patent No. 159,207, dated January 26, 1875; application filed August 10, 1874.

*To all whom it may concern:*

Be it known that I, WARREN D. PARSON, of Denver, in the county of Arapahoe and Territory of Colorado, have invented certain new and useful Improvements in Windmills; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a windmill, as will be hereinafter more fully set forth.

In the accompanying drawing, Figure 1 is a side elevation of my entire windmill, and Fig. 2 is a plan view of the wheel thereof.

A represents the main shaft, to which are keyed, or otherwise fastened, the heads B B of the wheel, and the spider C at a suitable point between the heads. To this shaft should also be attached a gear or other suitable device for transmitting power. A' represents a shaft, made to turn in suitable boxes secured in the frame E of the windmill. The lower end of this shaft A' enters a socket secured on the upper end of the shaft A, or at the top of the wind-wheel, so that the two shafts may revolve independent of each other, though being on one axial line. D is the weather-vane, hinged loosely on the shaft A'. $a^1$ is a segment of a grooved pulley, made fast to the shaft A', and connected by a chain, $a$, with a similar grooved segment, $a^2$, which works loosely on a stud or pin projecting from the side of the vane D. To the segment $a^2$ is fastened a lever, D¹, provided at its outer end with a weight, D², said lever extending in the opposite direction from the vane. On the lower end of the shaft A' is attached a spider for holding the arms G G, and to the outer ends of these arms are attached the fenders or guards H H. Below the wheel are other arms, G¹ G¹, to which the lower ends of the fenders are attached, the inner ends of said arms G¹, being formed or provided with a ring, which works on a collar, G², made fast to the bottom head of the wheel. I I represent the buckets or vanes of the wind-wheel, hinged at the center on rods $b\ b$, which are fastened to the heads B B by nuts or other suitable means. J J represent three-armed levers, hinged or pivoted to the spider C, and provided with weights J' J'. The third arms of the levers are, by rods $d$, connected with the vanes I. Below the wheel on the shaft A is a slide, L, connected by rods $h\ h$ with a slide, L', within the wheel below the spider C, and through this slide L' are loosely passed rods $i\ i$, with nuts upon their lower ends, and these rods connect with the middle arms of the levers J J. The guards or fenders H H' prevent the wind from striking the wheel in such a direction as to run it backward, and also convey into the wheel the portion of wind which would otherwise be thrown off and lost, thus causing the same to be converted into power. The two fenders are constructed as shown in Fig. 2— one, H, having a series of inclined vertical and curved slats, the tendency of which, under a pressure of wind, is to recede and go back of the wheel. The other, H', is constructed so as to convey more wind into the wheel, and thus enlarge the working area. The hinged vane D and weighted lever D¹, with their connections $a\ a^1\ a^2$, allow or cause the fender to recede in heavy wind, and the weighted lever brings them back in place after the wind has subsided. As the former fender recedes the latter is brought in front of the wheel, thus shutting out the wind from the wheel, while the receding fender allows a contrary current of wind to strike the wheel. These parts being properly adjusted, an automatic governor is formed, which causes a large amount of wind to strike the wheel, if the breeze be light, and throwing it off if the wind be heavy, and guarding against any dangerous strain from wind-pressure. To make the wheel doubly safe in high winds, and to make it adaptable to all kinds of work, another governor is provided, consisting of the levers J. The weighted ends of these levers rise by centrifugal force, throwing their upper ends inward, drawing the buckets or vanes I with them, shutting out all wind not required to run the wheel at a certain speed. If the wind be variable the weights J' will rise and exclude the wind if there be an excess, and drop of their own gravity, and open the buckets and receive more wind if the wind be light, or if more work be attached. By hanging the buckets in the center on the rods $b$ the pressure of wind is equal on both sides, thus forming a balance, and requiring but little or no power to reef or furl the buckets, as the case may be.

The construction of the centrifugal governor admits of dispensing with any weights or springs to unfurl the sails after the governor had reefed them, the resistance of such weights or springs having necessarily to be overcome before the governor could act. My governor hangs perfectly free to act without this resistance to overcome, making it extremely sensitive to any variation of speed in the wind-wheel. This governor holds the buckets at the most desirable angle (forty-five degrees) to receive power from the wind when open.

The wind-wheel may be stopped from below, at pleasure, by a suitable connection, with the slide L to pull the same downward, when the levers J will close the buckets tightly all around the wheel.

Having thus fully described my invention, what I claim as new, and desire to secure by Letters Patent, is—

1. The fenders or guards H H′, constructed as described, and operated by means of the lever $D^1$, substantially as and for the purposes herein set forth.

2. The combination of the vane D, grooved segments $a^1$ $a^2$, chain $a$, and lever $D^1$, all constructed substantially as and for the purposes herein set forth.

3. The shafts A A′, independently connected to the frame, in combination with vane D, lever $D^1$, weight $D^2$, and fenders or guards, substantially as and for the purpose specified.

In testimony that I claim the foregoing as my own I affix my signature in presence of two witnesses.

WARREN D. PARSON.

Witnesses:
 FRANK CHURCH,
 EDWARD F. BISHOP.